United States Patent
Bains et al.

(10) Patent No.: US 10,346,356 B2
(45) Date of Patent: Jul. 9, 2019

(54) METHODS AND SYSTEMS FOR SEARCHING COMPUTER-AIDED DESIGN DATA

(71) Applicant: Robert Bosch GmbH, Stuttgart (DE)

(72) Inventors: Baljit Bains, Canton, MI (US); Pendyala Naga Venkata Krishna Rao, Andhra Pradesh (IN); Surendran Devaraj, Tamil Nadu (IN); Vijay Anthony Josepharuldass, Tamil Nadu (IN)

(73) Assignee: Robert Bosch GmbH, Stuttgart (DE)

( * ) Notice: Subject to any disclaimer, the term of this patent is extended or adjusted under 35 U.S.C. 154(b) by 617 days.

(21) Appl. No.: 15/004,681

(22) Filed: Jan. 22, 2016

(65) Prior Publication Data

US 2017/0212903 A1   Jul. 27, 2017

(51) Int. Cl.

| | |
|---|---|
| *G06F 16/14* | (2019.01) |
| *G06F 16/16* | (2019.01) |
| *G06F 17/50* | (2006.01) |
| *G06F 3/0481* | (2013.01) |
| *G06F 3/0484* | (2013.01) |

(52) U.S. Cl.
CPC ........ *G06F 16/148* (2019.01); *G06F 3/04817* (2013.01); *G06F 3/04842* (2013.01); *G06F 16/14* (2019.01); *G06F 16/164* (2019.01); *G06F 17/50* (2013.01); *G06F 2217/02* (2013.01); *G06F 2217/06* (2013.01)

(58) Field of Classification Search
CPC .................................................... G06F 17/50
See application file for complete search history.

(56) References Cited

U.S. PATENT DOCUMENTS

| | | | | |
|---|---|---|---|---|
| 6,134,338 | A | * | 10/2000 | Solberg .............. G06K 9/00476 |
| | | | | 382/113 |
| 7,062,532 | B1 | | 6/2006 | Sweat et al. |
| 7,069,095 | B2 | | 6/2006 | Nelson et al. |
| 7,103,434 | B2 | | 9/2006 | Chernyak et al. |

(Continued)

FOREIGN PATENT DOCUMENTS

WO    2015060898 A1    4/2015

OTHER PUBLICATIONS

Camba, J. et al., "Extended 3D annotations as a new mechanism to explicitly communicate geometric design intent and increase CAD model reusability", Computer Aided Design, vol. 57, Jul. 22, 2014, pp. 61-73.

(Continued)

*Primary Examiner* — William Spieler
(74) *Attorney, Agent, or Firm* — Michael Best & Friedrich LLP

(57) ABSTRACT

Methods and systems for searching computer-aided design (CAD) data. One method includes receiving a selection of a type of CAD metadata, displaying a user interface including at least one input mechanism for receiving a search parameter associated with the type of CAD metadata, and receiving the search parameter through the user interface. The method also includes, in response to receiving the search parameter, automatically identifying, with an electronic processor, CAD metadata associated with the CAD data matching the search parameter, and providing the CAD metadata matching the search parameter to a user.

19 Claims, 13 Drawing Sheets

(56) References Cited

U.S. PATENT DOCUMENTS

| | | | |
|---|---|---|---|
| 7,492,374 B2 | 2/2009 | Qamhiyah et al. | |
| 8,640,079 B2 | 1/2014 | Majumder et al. | |
| 8,768,651 B2 | 7/2014 | Bhaskaran et al. | |
| 8,812,272 B2 | 8/2014 | Martin et al. | |
| 8,856,706 B2 | 10/2014 | Mneimneh et al. | |
| 8,874,525 B2 | 10/2014 | Grossman et al. | |
| 2002/0112114 A1* | 8/2002 | Blair .................... | G06Q 30/08 711/100 |
| 2006/0004549 A1* | 1/2006 | Qamhiyah ........ | G06F 17/30259 703/1 |
| 2008/0188969 A1 | 8/2008 | O'Malley et al. | |
| 2012/0163775 A1* | 6/2012 | Banerjee ................. | H04N 5/77 386/280 |

OTHER PUBLICATIONS

"Geometric dimensioning and tolerancing", Wikipedia, Dec. 30, 2015, 5 pages, https://en.wikipedia.org/wiki/Geometric_dimensioning_and_tolerancing.

"Surface finish", Wikipedia, Sep. 24, 2015, 3 pages, https://en.wikipedia.org/wiki/Surface_finish.

International Search Report for Application No. PCT/EP2017/050134 dated Apr. 24, 2017 (5 pages).

\* cited by examiner

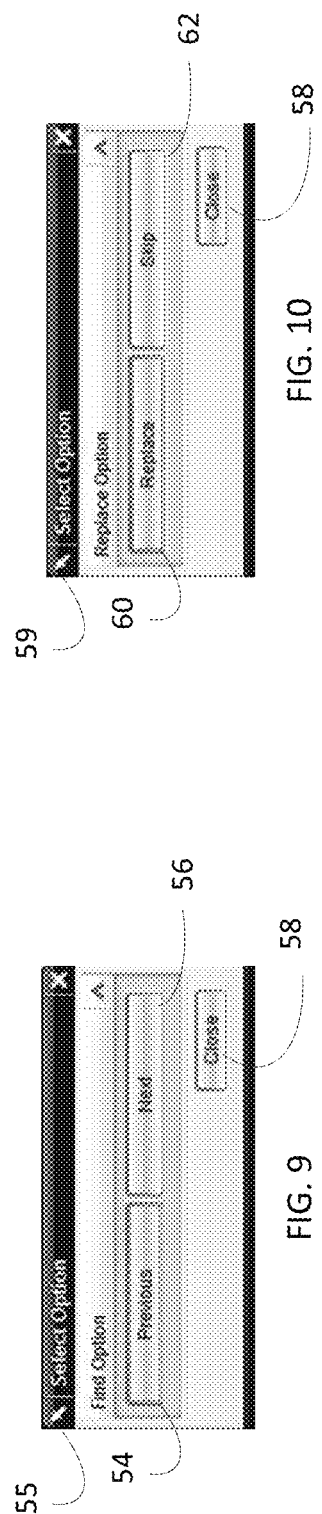

METHODS AND SYSTEMS FOR SEARCHING COMPUTER-AIDED DESIGN DATA

FIELD

Embodiments of the invention relate to methods and systems for searching computer-aided design (CAD) data, such as a two-dimensional engineering drawing or a three-dimensional engineering model.

BACKGROUND

Computer-aided design (CAD) data can include a two-dimensional engineering drawing (see FIG. 1) or a three-dimensional engineering model (see FIG. 2). Two-dimensional drawings and three-dimensional models both include dimensions and annotations. For example, FIG. 1 illustrates a two-dimensional drawing with dimensions and annotations. Similarly, FIG. 2 illustrates a three-dimensional model with dimensions and annotations. Dimensions are derived from the CAD data (e.g., the graphical representations included in a two-dimensional drawing or a three-dimensional model) and annotations are representations added to the CAD data, which include but are not limited to notes, labels, geometric dimensioning and tolerance (GDT) symbols and callouts (feature control frames, modifiers, datums, and the like), tolerances, surface finish symbols, identification symbols, abbreviations, and custom or standard symbols per engineering technical standards. Dimensions and annotations can be associated with one or more parameters each having a value. For example, a dimension can be associated with a dimension value and a tolerance value. Accordingly, an instance of a dimension can have a dimension value of 2.18 and a tolerance value of 0.08 (see FIG. 3) and can be displayed in a two-dimensional drawing or a three-dimensional model. Similarly, a GDT symbol can be associated with symbol value and a tolerance value. Accordingly, a specific instance of a GDT symbol can have a symbol value of "position" and a tolerance value 0.5 (see FIG. 4) and can be displayed in a two-dimensional drawing or a three-dimensional model.

When working with CAD data, a user may want to locate a particular instance of a dimension or an annotation. Currently, to perform this functionality, a user must visually search the CAD data to manually locate the desired data. Accordingly, this process is timely and prone to error.

SUMMARY

Accordingly, embodiments of the invention provide methods and systems for searching computer-aided design (CAD) data for a dimension, an annotation, or both (collectively referred to as "CAD metadata" as defined below). Some embodiments receive user input selecting a type of CAD metadata and selecting one or more search parameters associated with the selected type of CAD metadata. A search is then conducted on CAD metadata associated with the CAD data to identify CAD metadata (e.g., dimensions, annotations, or both) matching the selected type of CAD metadata and the one or more search parameters. The results of the search are provided to a user for review (e.g., visually or in report form).

For example, one embodiment of the invention provides a method searching CAD data. The method includes receiving a selection of a type of CAD metadata, displaying a user interface including at least one input mechanism (e.g., a text field or a menu) for receiving a search parameter associated with the type of CAD metadata, and receiving the search parameter through the user interface. The method also includes, in response to receiving the search parameter, automatically identifying, with an electronic processor, CAD metadata associated with the CAD data matching the search parameter, and providing the CAD metadata matching the search parameter to a user.

Another embodiment of the invention provides a system for searching CAD data. The system includes an electronic processor configured to receive a selection of a type of CAD metadata, display a user interface including at least one input mechanism for receiving a search parameter associated with the type of CAD metadata, and receive the search parameter through the user interface. The electronic processor is also configured to, in response to receiving the search parameter, automatically identify CAD metadata associated with the CAD data matching the search parameter, and provide the CAD metadata matching the search parameter to a user.

Yet another embodiment of the invention provides a non-transitory computer-readable medium containing instructions that, when executable by an electronic processor, perform a set of functions. The set of functions includes receiving a selection of a type of CAD metadata, displaying a user interface including at least one input mechanism for receiving a search parameter associated with the type of CAD metadata, and receiving the search parameter through the user interface. The set of functions also includes, in response to receiving the search parameter, automatically identifying CAD metadata associated with CAD data matching the search parameter, wherein the CAD data includes a two-dimensional drawing or a three-dimensional model, and providing the CAD metadata matching the search parameter to a user.

Other aspects of the invention will become apparent by consideration of the detailed description and accompanying drawings.

BRIEF DESCRIPTION OF THE DRAWINGS

FIGS. 9 and 10 illustrate user interfaces for navigating search results provided as part of the method of FIG. 6.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more electronic processors, one or more memory modules including non-transitory computer-readable medium, one or more input/output interfaces, and various connections (e.g., a system bus) connecting the components.

Figure 5:
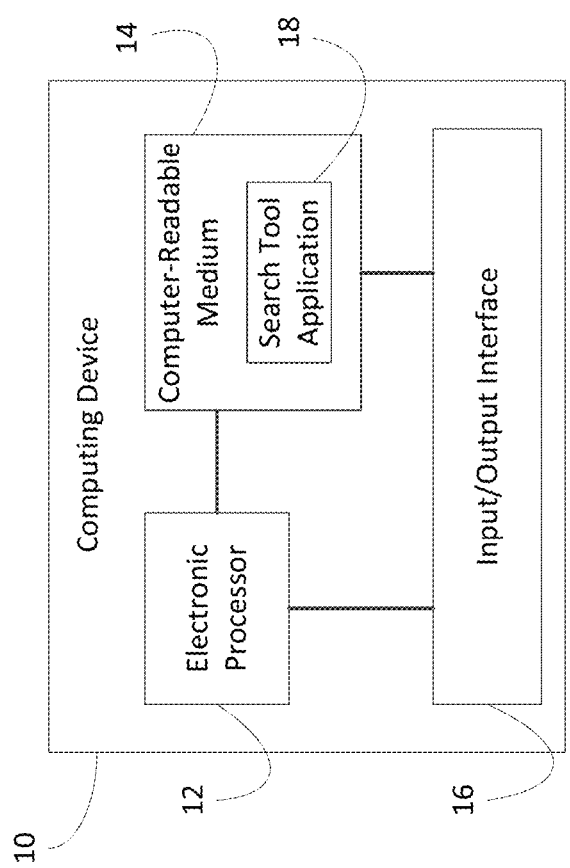
FIG. 5 schematically illustrates a computing device.

FIG. 5 schematically illustrates a computing device 10. The computing device 10 can include a smart phone, a tablet computer, a laptop, a computer, a desktop computer, a smart television, a kiosk, a smart watch, and the like. As illustrated in FIG. 5, the computing device 10 includes an electronic processor 12 (e.g., a microprocessor or other programmable device), a non-transitory computer-readable medium 14, and an input/output interface 16. It should be understood that the computing device 10 can also include additional components. Also, the computing device 10 can be configured to perform additional functionality than the functionality described below. In addition, the functionality performed by the computing device 10 as described below can be distributed among multiple computing devices.

The electronic processor 12 is configured to retrieve instructions and data from the computer-readable medium 14 (e.g., read-only memory, random-access memory, or combinations thereof) and execute, among other things, the instructions. In particular, the computer-readable medium 14 can store a search tool application 18. The electronic processor 12 is configured to execute instructions included in the search tool application 18 to perform a set of functions including the methods described herein.

The input/output interface 16 transmits data from the computing device 10 to external systems, networks, and/or devices and receives data from external systems, networks, and/or devices. The input/output interface 16 can also store data received from external sources to the computer-readable medium 14 and/or provide the data to the electronic processor 12. The input/output interface 16 can communicate with one or more peripheral devices (not shown), such as one or more input devices (e.g., a keyboard, a mouse, a touchscreen, a trackball, a joystick, and the like) and one or more output devices (e.g., a display device, a printer, and the like). The input/output interface 16 can communicate with these peripheral devices using a wired or wireless connection. In some embodiments, the input/output interface 16 can also communicate with one or more networks. For example, the input/output interface 16 can communicate with the Internet, a local area network, a wide area network, and the like to transmit and receive data (e.g., send and receive emails, access websites, and the like). For example, in some embodiments, the computing device 10 is a server that provides access to functionality provided by the search tool application 18 to other computing devices through a network connection. In this configuration, the server receives user input from an external computing device and provides output (e.g., user interfaces and search results) to the external computing device. In some embodiments, the external computing device executes a browser application to access the functionality provided by the search tool application 18 hosted by the server. In other embodiments, the external computing device executes a proprietary software application to access the functionality provided by the search tool application 18 hosted by the server.

Figure 1:
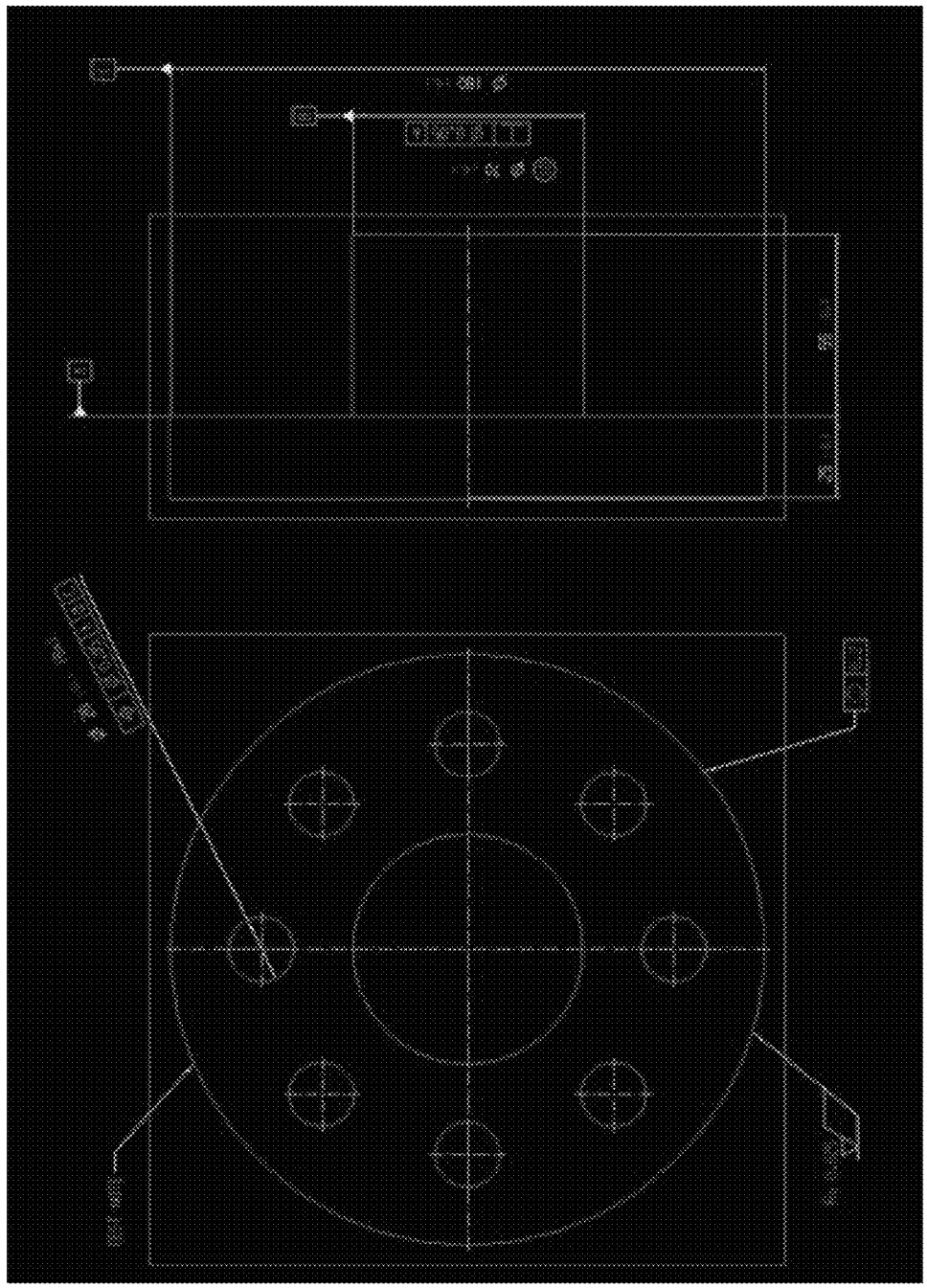
FIG. 1 illustrates a two-dimensional drawing.
Figure 2:
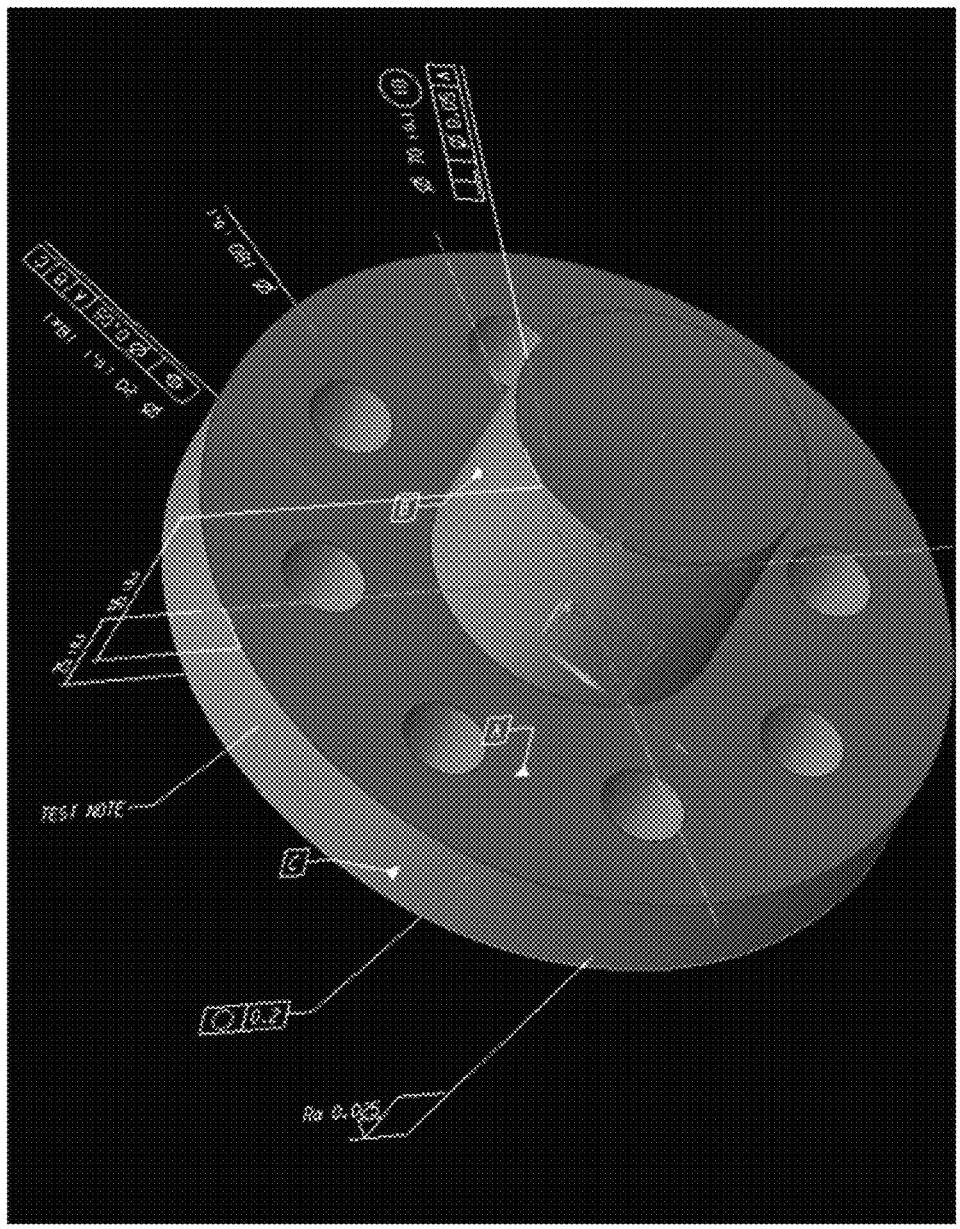
FIG. 2 illustrates a three-dimensional model.
Figure 4:
FIG. 4 illustrates a geometric dimensioning and tolerance symbol.
Figure 3:
FIG. 3 illustrates a dimension.

As noted above, the electronic processor 12 executes instructions stored in the medium 14 to perform various methods. For example, the electronic processor 12 executes the search tool application 18 to conduct a search within computer-aided design (CAD) data based on user input. As noted above, CAD data can include a two-dimensional engineering drawing (see FIG. 1) or a three-dimensional engineering model (see FIG. 2). Two-dimensional drawings and three-dimensional models both can have dimensions and annotations. For example, FIG. 1 illustrates a two-dimensional drawing with dimensions and annotations, and FIG. 2 illustrates a three-dimensional model with dimensions and annotations. Dimensions are derived from the CAD data (i.e., the graphical representations included in the two-dimensional drawing or the three-dimensional model) and annotations are representations added to the CAD data, which include but are not limited to notes, labels, geometric dimensioning and tolerance (GDT) symbols and callouts (feature control frames, modifiers, datums, and the like), tolerances, surface finish symbols, identification symbols, abbreviations, and custom or standard symbols per engineering technical standards. Dimensions and annotations can be associated with one or more parameters each having a value. For example, a dimension can be associated with a dimension value and a tolerance value. Similarly, a GDT symbol can be associated with symbol value and a tolerance value. Accordingly, as used in the present application, the term "CAD metadata" includes both dimensions and annotations that describe and give information about CAD data (i.e., a two-dimensional drawing or a three-dimensional model). In other words, CAD data (i.e., a two-dimensional drawing or a three-dimensional model) is associated with CAD metadata that includes both dimensions and annotations.

The search tool application 18 executed by the electronic processor 12 can search CAD metadata (e.g., dimensions, annotations, or both) associated within CAD data and identify CAD metadata that matches one or more search parameters specified by a user (e.g., a tolerance value, a dimension value, a symbol value, and the like). For example, in one embodiment, the electronic processor 12 executes the search tool application 18 to perform the method 20 illustrated in FIG. 6. It should be understood that the search tool application 18 can perform other functionality than just the functionality illustrated in FIG. 6. For example, in some embodiments, the search tool application 18 also provides CAD data creation functionality that allows a user to create CAD data (e.g., a two-dimensional drawing or a three-dimensional model). Also, in some embodiments, the functionality illustrated in FIG. 6 is distributed among multiple software applications.

Figure 6:
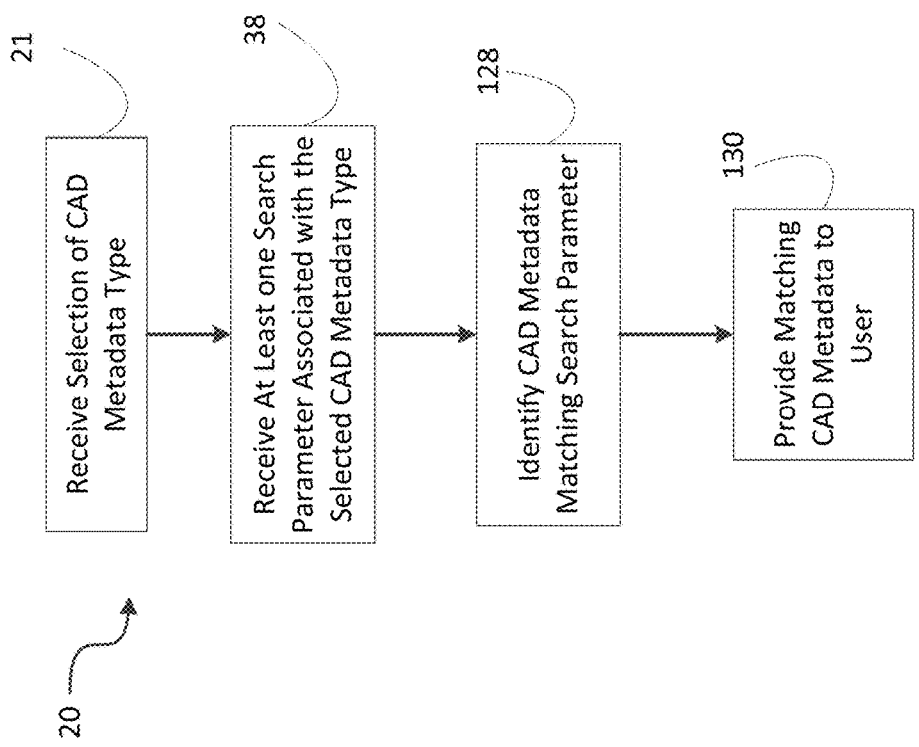
FIG. 6 is a flow chart illustrating a method performed by the computing device of FIG. 5 to search computer-aided design data.
Figure 7:
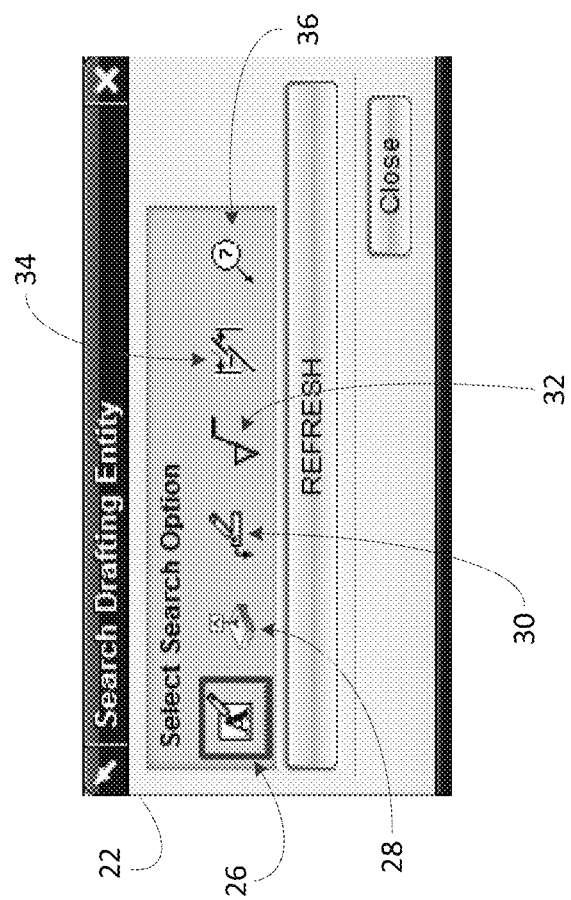
FIG. 7 illustrates a user interface displayed as part of the method of FIG. 6.

As illustrated in FIG. 6, the method 20 includes receiving a selection of a type of CAD metadata (at block 21). In some embodiments, the electronic processor 12 receives the selection through a user interface. For example, FIG. 7 illustrates one example of a user interface 22 generated and displayed by the electronic processor 12. In some embodiments, the user interface 22 is displayed within a pop-up window associated with currently-open or currently-active CAD data (e.g., a currently displayed two-dimensional drawing or a currently displayed three-dimensional model). In other embodiments, the user interface 22 is displayed as part of a menu.

The user interface 22 includes one or more input mechanisms for receiving a selection of a type of CAD metadata. For example, in some embodiments, the user interface 22 includes a text-based menu (e.g., a drop-down menu) that lists a plurality of metadata types. In other embodiments, the user interface 22 includes a set of icons, wherein each icon represents a different type of metadata. For example, as illustrated in FIG. 7, the user interface 22 can include a text string search icon 26, a datum search icon 28, a GDT symbol search icon 30, a surface finish symbol search icon 32, a dimension search icon 34, and an identification symbol search icon 36. Accordingly, the electronic processor 12 can receive a selection of a type of CAD metadata through a selection of one of the icons. As illustrated in FIG. 7, in some embodiments, the icon representing a currently-selected metadata type is marked (e.g., with a border or another type of highlighting) within the user interface 22.

It should be understood that in some embodiments, the search tool application 18 defaults to a particular type of CAD metadata. Accordingly, in these embodiments, the electronic processor 12 does not receive a selection of a type of CAD metadata from a user (e.g., through a user interface). Rather, the electronic processor 12 receives a selection of a type of CAD metadata by accessing configuration data or instructions associated with the search tool application 18.

Returning to FIG. 6, after receiving a selection of a type of CAD metadata, the electronic processor 12 receives one or more search parameters (at block 38). A search parameter can include a value associated CAD metadata (e.g., a value associated with a dimension or an annotation). For example, a search parameter can include a specific symbol value, a dimension value, a tolerance value, a text string, a datum value, and the like. A search parameter can also include a search option that defines the scope of the search. For example, in some embodiments, a search parameter includes a selection of particular CAD data (e.g., one or more two-dimensional drawings, one or more three-dimensional models, or a combination thereof) for the search. Accordingly, based on the selected CAD data, the electronic processor 12 searches the corresponding CAD metadata to identify metadata. In other embodiments, the electronic processor 12 can be configured to search metadata associated with open or currently displayed CAD data, such as a two-dimensional drawing or three-dimensional mode that is currently displayed or currently active. In other embodiments, a search parameter includes a selection of a particular area or portion of CAD data for the search (e.g., notes, labels, and the like).

In some embodiments, the electronic processor 12 receives search parameters through the user interface 22. However, it should be understood that the electronic processor 12 can change the user interface 22 based on the type of CAD metadata selected and other user selections. Also, in some embodiments, the electronic processor 12 receives the selection of the type of CAD metadata and the search parameters through separate user interfaces.

Figure 8:
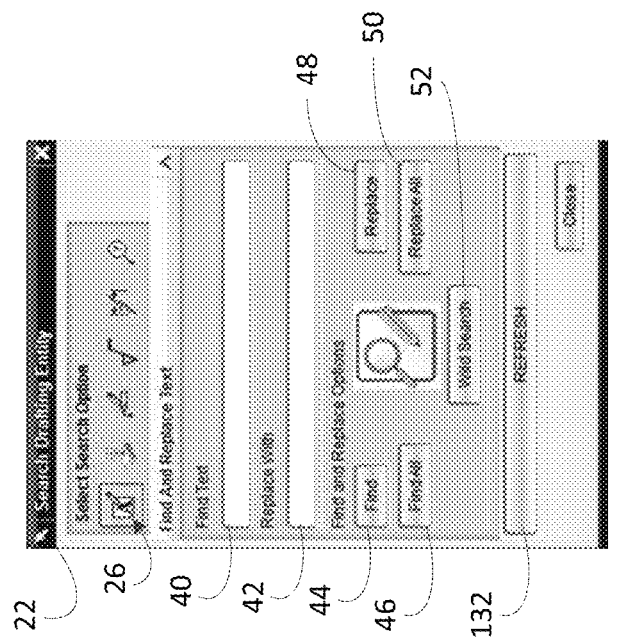
FIG. 8 illustrates the user interface of FIG. 7 including input mechanisms for receiving search parameters for a text string.

In some embodiments, the one or more search parameters vary depending on the type of CAD metadata selected. For example, FIGS. 8-18 illustrate configurations of the user interface 22 for receiving one or more search parameters for different types of CAD metadata. In particular, FIG. 8 illustrates one example of the user interface 22 including one or more input mechanisms (e.g., input fields, buttons, check boxes, drop-down menus, lists, and the like) for receiving a search parameter associated with a text string (e.g., displayed in response to selection of the text string search icon 26). For example, as illustrated in FIG. 8, the user interface 22 can include a find text field 40 and, optionally, a replace with field 42. The find text field 40 receives user input (e.g., entered through a keyboard) representing a first text string. Similarly, the replace with field 42 receives user input representing a second text string. The string received through the find text field 40, the replace with field 42, or both can be case sensitive.

As illustrated in illustrated in FIG. 8, the user interface 22 can also include a find button 44, a find all button 46, a replace button 48, a replace all button 50, and a wild search button 52 that specify search options (e.g., a scope of the search). For example, when the find button 44 is selected, the electronic processor 12 identifies a text string (e.g., a first text string starting at the start or top of a two-dimensional drawing or a three-dimensional model) included in CAD metadata (e.g., dimensions or annotations) matching the first string received through the find text field 40 (when at least one such text string exists). As illustrated in FIG. 9, the electronic processor 12 can generate a user interface 55 that allows a user to navigate between matching text strings (e.g., using a next button 56, a previous button 54, and a close button 58). Similarly, when the find all button 46 is selected, the electronic processor 12 identifies all text strings included in CAD metadata matching the first string received through the find text field 40. As described in more detail below, the electronic processor 12 can mark (e.g., highlight) a matching text string.

When the replace button 48 is selected, the electronic processor 12 identifies a text string included in CAD metadata matching the first string received through the find text field 40 (when at least one such text string exists) and replaces the identified text string with the second text string received through the replace with field 42. Again, as illustrated in FIG. 10, the electronic processor 12 can generate a user interface 59 that allows a user to navigate between matching text strings and make replacements as desired (e.g., using a replace button 60, a skip button 62, and a close button 58). Similarly, when the replace all button 50 is selected, the electronic processor 12 identifies all text strings included in CAD metadata matching the first string received through the find text field 40 and replaces all of the identified text strings with the second text string received through the replace with field 42.

When the wild search button 52 is selected, the electronic processor 12 identifies one or more text strings included in CAD metadata matching at least a portion of the first string received through the find text field 40 (e.g., at least one word or sequence of numerals and/or text match). Alternatively or in addition, in some embodiments, when the wild search button 52 is selected, the electronic processor 12 searches different portions of CAD metadata for matching text as compared to when the find button 44, the find all button 46, the replace button 48, or the replace all button 50 is selected. For example, in some embodiments, when the find button 44, find all button 46, replace button 48, or replace all button 50 is selected, the electronic processor 12 is configured to search only predefined CAD metadata (e.g., notes, labels, and tabular notes). However, when the wild search button 52 is selected, the electronic processor 12 can be configured to search all CAD metadata, including any dimensions and all types of annotations. Also, in some embodiments, when the wild search button 52 is selected and two or more words or phrases are received through the find text field 40, the electronic processor 12 is configured to identify text strings matching the two or more words separately or in combination.

Figure 11:
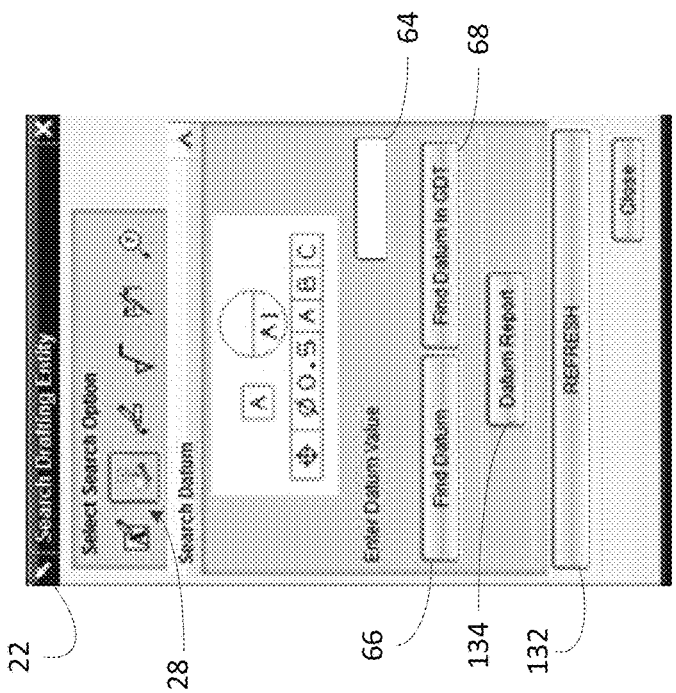
FIG. 11 illustrates the user interface of FIG. 7 including input mechanisms for receiving search parameters for a datum value.

FIG. 11 illustrates another example of the user interface 22 including one or more input mechanisms (e.g., input fields, buttons, check boxes, drop-down menus, lists, and the like) for receiving a search parameter associated with a datum (e.g., displayed in response to selection of the datum search icon 28). As illustrated in FIG. 11, the user interface 22 can include a datum value field 64. The datum value field 64 receives user input representing a datum value (e.g., a numerical value).

As also illustrated in FIG. 11, when a datum is being searched for, the user interface 22 can include one or more selection mechanisms for specifying search options, including a find datum button 66 and a find datum in GDT button 68. When the find datum button 66 is selected, the electronic processor 12 searches CAD metadata to identify metadata (e.g., a dimension, a GDT symbol, a surface finish symbol, and the like) having a value matching the value specified through the datum value field 64 regardless of the type of the metadata (e.g., regardless of whether the value is included in a dimension or a particular type of annotation). However, when the find datum in GDT button 68 is selected, the electronic processor 12 searches the CAD metadata to identify only GDT symbols having a matching datum value.

Figure 12:
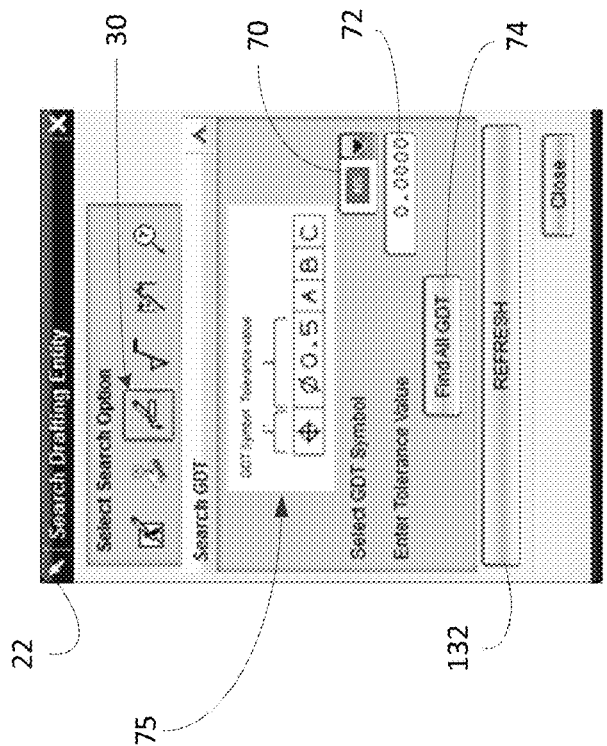
FIG. 12 illustrates the user interface of FIG. 7 including input mechanisms for receiving search parameters for a geometric dimensioning and tolerance symbol.

FIG. 12 illustrates yet another example of the user interface 22 including one or more input mechanisms (e.g., input fields, buttons, check boxes, drop-down menus, lists, and the like) for receiving at least one search parameter associated with a GDT symbol (e.g., displayed in response to selection of the GDT symbol search icon 30). For example, the user interface 22 can include a GDT symbol drop-down menu 70 and a tolerance value field 72. The GDT symbol drop-down menu 70 receives user input representing a symbol value. The tolerance value field 72 receives user input representing a tolerance value. In some embodiments, a user is not required to provide input through both the GDT symbol drop-down menu 70 and the tolerance value field 72. For example, when a user selects a find all GDT button 74 included in the user interface 22 and has selected a GDT symbol value but not a tolerance value, the electronic processor 12 searches CAD metadata for GDT symbols having the selected symbol value regardless of what the tolerance value is. Similarly, when a user selects the find all GDT button 74 and has selected a tolerance value by not a GDT symbol value (e.g., has selected a no symbol ("NS") value as the GDT symbol value), the electronic processor 12 searches CAD metadata for a GDT symbol having the specified tolerance value regardless of what the symbol value is. Furthermore, when a user has selected both a symbol value and a tolerance value and then selects the find all GDT button 74, the electronic processor 12 searches Cd metadata for a GDT symbol having the specified symbol value and the specified tolerance value.

In some embodiments, the electronic processor 12 is also configured to display a legend of the selected type of CAD metadata to aid a user in providing a search parameter. For example, as illustrated in FIG. 12, the user interface 22 can include a legend 75 that illustrates a format or structure of a GDT symbol and one or more parameters associated with a GDT symbol (e.g., a symbol value and a tolerance value). Accordingly, a user can use the legend 75 to know what search parameters to specify when searching for a GDT symbol.

Figure 15:
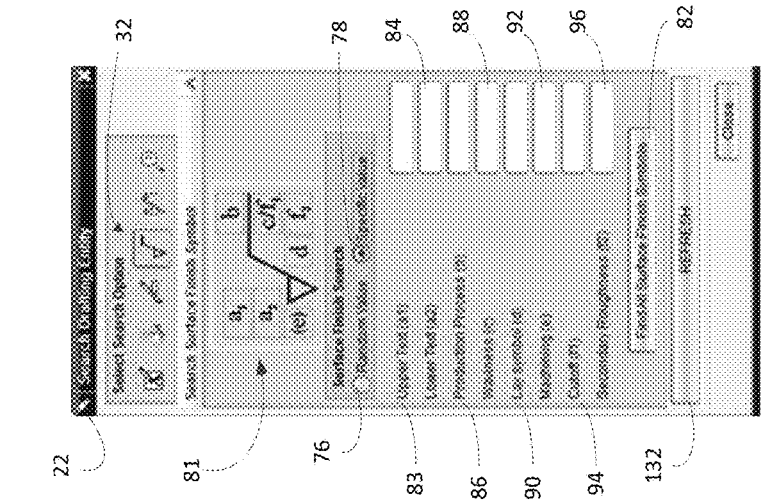
FIGS. 13-15 illustrate the user interface of FIG. 7 including input mechanisms for receiving search parameters for a surface finish symbol.
Figure 13:
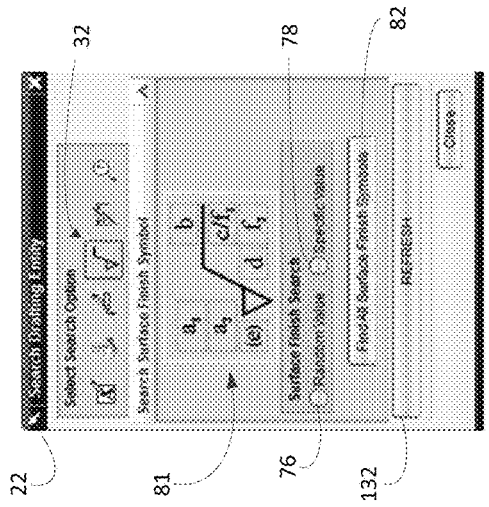
Figure 14:
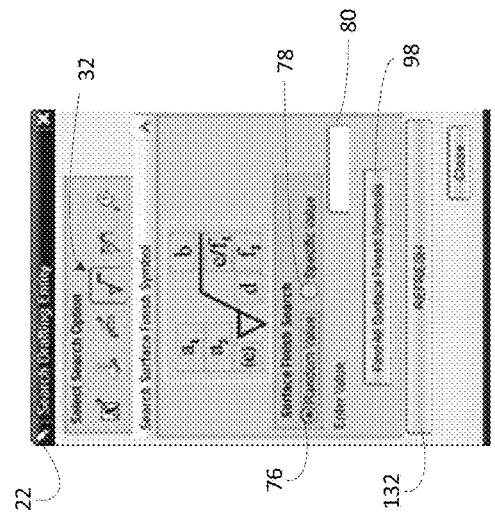

FIGS. 13-15 illustrate yet a further example of the user interface 22 including one or more input mechanisms (e.g., input fields, buttons, check boxes, drop-down menus, lists, and the like) for receiving at least one search parameter associated with a surface finish symbol (e.g., displayed in response to selection of the surface finish symbol search icon 32). For example, the user interface 22 can include a random value search option 76 and a specific value search option 78. As illustrated in FIG. 14, when the random value search option 76 is selected, the user interface 22 includes a value field 80. The value field 80 is configured to receive a value associated with a parameter of a surface finish symbol (e.g., a cutoff value, a waviness value, and the like). For example, as illustrated in FIG. 10, the user interface 22 can include a legend 81 of a surface finish symbol, which indicates a plurality of parameters associated with a surface finish symbol (e.g., upper text, lower text, production process, and the like). Accordingly, when the random value search option 76 is selected, a value is provided through the value field 80, and the find all surface finish symbols button 82 is selected, the electronic processor 12 searches CAD metadata to identify a surface finish symbol having the specified value regardless of what parameter of the surface finish symbol has the matching value (e.g., regardless of whether the upper text, lower text, or production process has the matching value).

In contrast, as illustrated in FIG. 15, when the specific value search option 78 is selected, the user interface 22 includes a plurality of input mechanisms for receiving one or more values for parameters associated with a surface finish symbol. For example, as illustrated in FIG. 2, the user interface 22 can include an upper text field 83, a lower text field 84, a production process field 86, a waviness field 88, a lay symbol field 90, a machining field 92, a cutoff field 94, and a secondary roughness field 96. As compared to a value provided through the value field 80, when the find all surface finish symbols button 82 is selected, the electronic processor 12 searches CAD metadata to identify a surface finish symbol that has a value matching any value provided through the upper text field 83, the lower text field 84, the production process field 86, the waviness field 88, the lay symbol field 90, the machining field 92, the cutoff field 94, and the secondary roughness field 96 for the associated parameter. For example, if a value of 10 is received through the secondary roughness field 96, the electronic processor 12 is configured to search CAD metadata for a surface finish symbol that has a value of 10 for the secondary roughness parameter. In contrast, if a value of 10 is received through the value field 80, the electronic processor searches CAD metadata for a surface finish symbol that has a value of 10 for any parameter.

Figure 17:
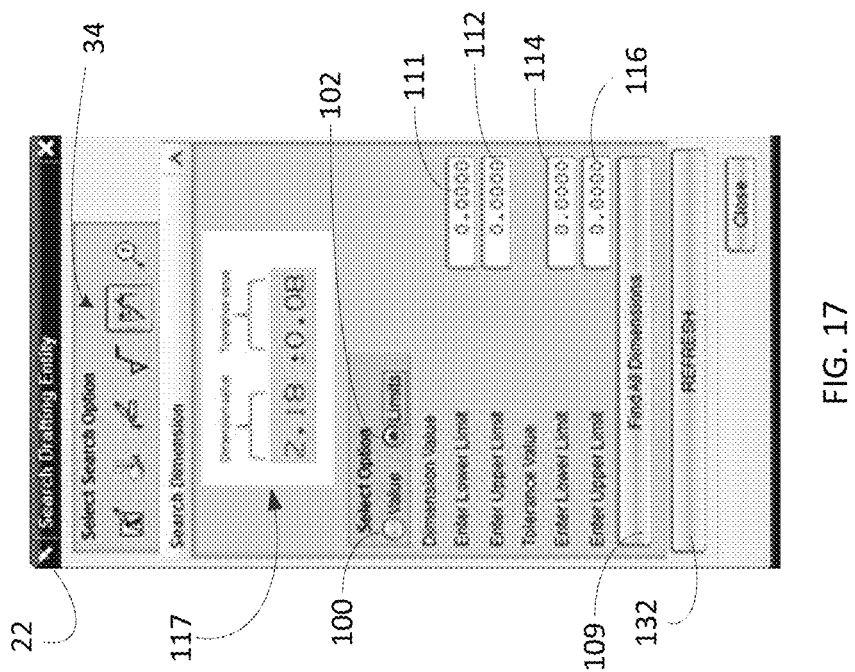
FIGS. 16-17 illustrate the user interface of FIG. 7 including input mechanisms for receiving search parameters for a dimension.
Figure 16:
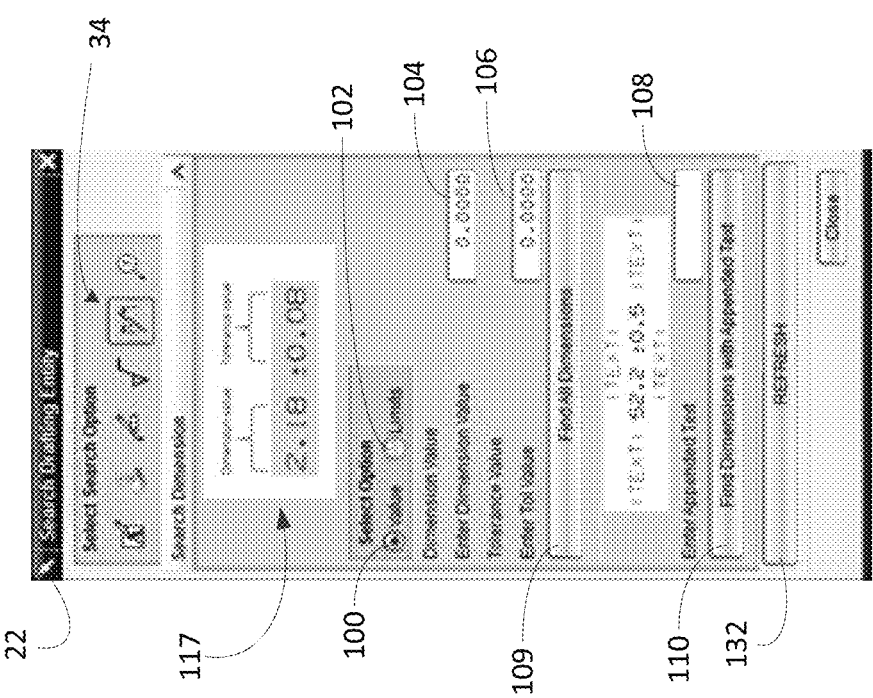

FIGS. 16-17 illustrate still another example of the user interface 22 including one or more input mechanisms (e.g., input fields, buttons, check boxes, drop-down menus, lists, and the like) for receiving at least one search parameter associated with a dimension (e.g., in response to selection of the dimension search icon 34). For example, the user interface 22 can include a value search option 100 and a limits search option 102.

As illustrated in FIG. 16, when the value search option 100 is selected, the user interface 22 includes input mechanisms for receiving specific values for a dimension and a tolerance. For example, as illustrated in FIG. 16, the user interface 22 can include a dimension value field 104, a tolerance value field 106, and an appended text field 108. The dimension value field 104 receives user input representing a dimension value, and the tolerance value field 106 receives user input representing a tolerance value. The appended text field 108 receives user input representing an appended text value. For example, a unit of measurement can be appended to a dimension (e.g., inches, meters, millimeters, and the like). Therefore, in some situations, the appended text field 108 allows a user to search for a dimension with a particular unit of measurement. Similarly, a measurement identifier can be appended to a dimension (e.g., width, height, depth, and the like). Accordingly, the appended text field 108 allows a user to search for a dimension associated with a particular measurement identifier.

In some embodiments, a user is not required to provide input through both the dimension value field 104 and the tolerance value field 106. For example, when the user provides a dimension value but not a tolerance value and selects a find all dimensions button 109, the electronic processor 12 searches CAD metadata for a dimension having a matching dimension value regardless of the tolerance value. Similarly, when the user provides a tolerance value but not a dimension value and selects the find all dimensions button 109, the electronic processor 12 searches CAD metadata for a dimension having a matching tolerance value regardless of the dimension value.

Similarly, in some embodiments, a user can provide input through the appended text field 108 with or without providing input through the dimension value field 104, the tolerance value field 106, or both. For example, when a user provides input (e.g., text) through the appended text field 108 and selects a find dimensions with appended text button 110, the electronic processor 12 searches CAD metadata for a dimension having matching appended text (regardless of the dimension value or tolerance value).

As illustrated in FIG. 17, when the limits search option 102 is selected, the user interface 22 allows a user to specify ranges for a dimension. For example, as illustrated in FIG. 17, the user interface 22 can include a dimension value lower limit field 111, a dimension value upper limit field 112, a tolerance value lower limit field 114, and a tolerance value upper limit field 116. The dimension value lower limit field 111 receives user input representing an upper limit value for a dimension value. The dimension value upper limit field 112 receives user input representing a lower limit value for a dimension value. The tolerance value lower limit field 114 receives user input representing a lower limit value for a tolerance value. The tolerance value upper limit field 116 receives user input representing an upper limit value for a tolerance value. When a user selects the find all dimensions button 109, the electronic processor 12 searches CAD metadata to identify a dimension having a dimension value, a tolerance, or both falling within the ranges specified through the dimension value lower limit field 111, the dimension value upper limit field 112, the tolerance value lower limit field 114, and the tolerance value upper limit field 116. Again, in some embodiments, a user is not required to provide a range for both a dimension value and a tolerance value. As also illustrated in FIGS. 16-17, the user interface 22 can include a legend 117 for a dimension.

Figure 18:
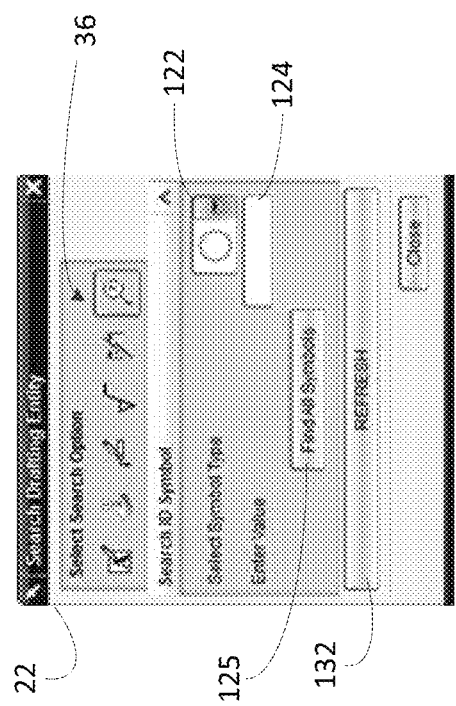
FIG. 18 illustrates the user interface of FIG. 7 including input mechanisms for receiving search parameters for an identification symbol.

FIG. 18 illustrates yet another example of the user interface 22 including one or more input mechanisms (e.g., input fields, buttons, check boxes, drop-down menus, lists, and the like) for receiving at least one search parameter associated with an identification symbol (e.g., displayed in response to selection of the identification symbol search icon 36). An identification symbol represents a predefined structure or feature included in CAD data, such as a screw, a diaphragm, a pump, a solenoid, a flow meter, and the like. Accordingly, an identification symbol is associated with a symbol value and an associated value (e.g., size, quantity, or other characteristic of the symbol value). Thus, as illustrated in FIG. 18, the user interface 22 can include a symbol type drop-down menu 122 and a value field 124. The symbol type drop-down menu 122 receives user input representing symbol value (e.g., a screw, a diaphragm, a pump, and the like), and the value field 124 receives user input representing a value (e.g., a text or numerical value, such as a quantity, a size, or other characteristic) associated with the design structure or feature represented by the symbol value. In some embodiments, a user is not required to provide input through both the symbol type drop-down menu 122 and the value field 124. For example, when a user provides a symbol value but does not provide an associated value through the value field 124 and the user selects a find all symbols button 125, the electronic processor 12 searches CAD metadata for an identification symbol having the specified symbol value (regardless of any values associated with symbol). Similarly, when the user provides a value but not a symbol type and selects the find all symbols button 125, the electronic processor 12 searches CAD metadata for an identification symbol having a matching value regardless of the associated symbol value.

It should also be understood that in some embodiments, the search parameters only include search options (e.g., and not specific values). For example, when the find all dimensions button 109 is selected but no dimension or tolerance values or ranges are specified (see FIGS. 16 and 17), the electronic processor 12 can be configured to search CAD metadata to identify each dimension. Similarly, when the find all surface finish symbols button 82 is selected but no values are provided (see FIGS. 14 and 15), the electronic processor 12 can be configured to search CAD metadata to identify each surface finish symbol.

Returning to FIG. 6, in response to receiving search parameters (at block 38), the electronic processor 12 automatically conducts a search to identify CAD metadata matching the search parameters (at block 128). In particular, the electronic processor 12 processes CAD metadata associated with CAD data to automatically identify metadata matching a particular type of metadata (e.g., selected by the user) and matching the search parameters (e.g., has values matching values included in the search parameters). It should be understood that CAD metadata can match the search parameters when the metadata matches the search parameters identically or partially. For example, when the search parameters for a dimension specify a particular dimension value, a particular tolerance range, and require text (e.g., any text) be appended to the dimension, the electronic processor 12 is configured to search CAD metadata for dimensions matching the specified value, having a tolerance value falling within the specified range, and having appended text. Alternatively, the electronic processor 12 can be configured to search CAD metadata for dimensions matching at least one of the specified value, the tolerance range, and the appended text.

After conducting the search and identifying CAD metadata matching the search parameters, the electronic processor 12 provides the matching CAD metadata to the user (at block 130). The electronic processor 12 can provide the matching CAD metadata by marking the matching CAD metadata within CAD data (e.g., within a two-dimensional drawing or a three-dimensional model), such as through highlighting, animation, color-coding, and the like. When a user is finished with the search results, the electronic processor 12 can remove the markings. For example, in some embodiments, the user interface 22 includes a refresh button 132, as seen in FIG. 8. When the refresh button 132 is selected, the electronic processor 12 removes markings from the CAD data. As illustrated in FIGS. 9 and 10 described above, the electronic processor 12 can also provide user interfaces for navigating through identified matches.

Figure 19:
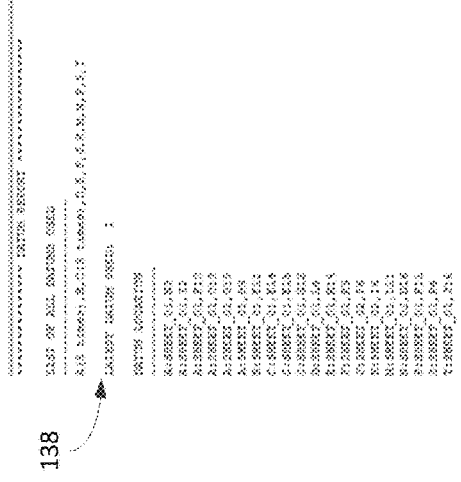
FIGS. 19-22 illustrate reports provided as part of the method of FIG. 6.
Figure 20:
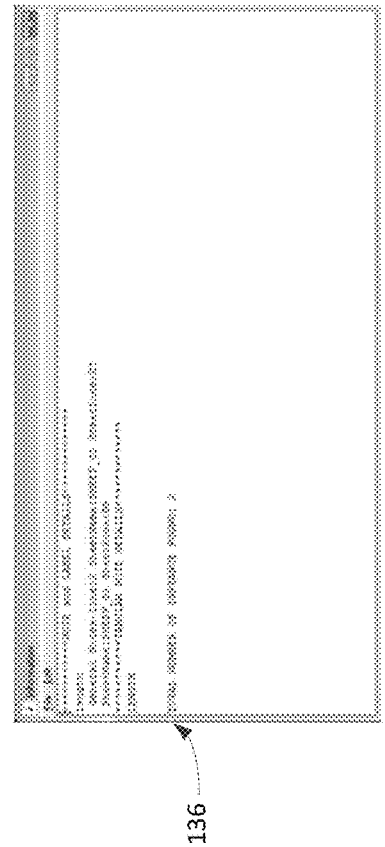
Figure 21:
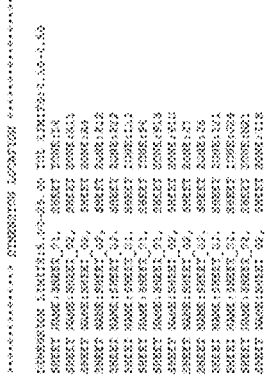
Figure 22:
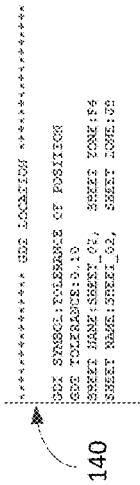

Alternatively or in addition, the electronic processor 12 can provide matching CAD metadata by generating a report including information associated with the matching metadata. In some embodiments, such a report is automatically generated by the electronic processor 12. Alternatively, the electronic processor 12 can generate a report in response to user input (e.g., in response to selection of the datum report button 134 illustrated in FIG. 11). FIGS. 19-22 illustrate exemplary search reports. FIG. 19 illustrates a text string search report 136. The text string search report 136 can include a total number of matching text strings found, a location of each matching text string (e.g., a dimension or annotation identifier), and, optionally, a copy of the matching text string (or a portion thereof). FIG. 20 illustrates a datum search report 138. The datum search report 138 can include a list of datums used, a latest datum used, and a datum location. FIG. 21 illustrates a GDT symbol search report 140. The GDT symbol search report 140 includes a GDT symbol searched for, a tolerance value searched for, and locations of matching GDT symbols. FIG. 19 illustrates a dimension search report 142. The dimension search report 142 includes, for example, dimension value limits, tolerance value limits, and locations of matching dimensions. It should be understood that after generating a report, the electronic processor 12 can display the report on a display device or provide the report to a peripheral device, such as a printer configured to generate a hard copy of the report. Also, in some embodiments, the electronic processor 12 can be configured to transmit a report (e.g., as part of an email message, as an upload to a server, and the like).

Thus, embodiments of the invention provide systems and methods for conducting a search of CAD metadata associated with CAD data, which can include a two-dimensional drawing or a three-dimensional model. The CAD metadata can include dimensions derived from the CAD data and manually added annotations. Accordingly, the systems and methods described herein receive search parameters from a user, which are used to search CAD metadata for matches. In particular, embodiments of the invention allow a user to specify a type of CAD metadata (e.g., a text string, a datum, a dimension, a GDT symbol, and the like) and specify search parameters customized based on the selected type of CAD metadata. Accordingly, based on user input, an electronic processor can automatically identify (a) particular types of metadata (e.g., all dimensions, all GDT symbols, and the like) and/or (b) metadata having particular values (e.g., dimension values, tolerance values, symbol values, roughness values, and the like). The results of the search are provided to a user within the CAD data and/or as a report, which allows a user to better manage CAD data.

Various features and advantages of the invention are set forth in the following claims.

What is claimed is:

1. A method of searching computer-aided design (CAD) data, the method comprising:
  receiving a selection of a type of CAD metadata via a user interface;
  changing the user interface to include at least one input mechanism for receiving a search parameter associated with the type of CAD metadata selected;
  receiving the search parameter through the user interface;
  in response to receiving the search parameter, automatically identifying, with an electronic processor, CAD metadata matching the search parameter, wherein the CAD metadata is associated with the CAD data; and
  providing the CAD metadata matching the search parameter to a user by marking the CAD metadata within the CAD data.

2. The method of claim 1, wherein receiving the selection of the type of CAD metadata includes receiving a selection of a geometric dimensioning and tolerance symbol.

3. The method of claim 2, wherein receiving the search parameter includes receiving a symbol value.

4. The method of claim 2, wherein receiving the search parameter includes receiving a tolerance value.

5. The method of claim 1, wherein receiving the selection of the type of CAD metadata includes receiving a selection of a surface finish symbol.

6. The method of claim 5, wherein receiving the search parameter includes receiving at least one selected from the group consisting of a production process, a waviness value, a machining value, and a roughness value.

7. The method of claim 1, wherein receiving the selection of the type of CAD metadata includes receiving a selection of a dimension.

8. The method of claim 7, wherein receiving the search parameter includes receiving a dimension value and a tolerance value.

9. The method of claim 7, wherein receiving the search parameter includes receiving a unit of measurement.

10. The method of claim 7, wherein receiving the search parameter includes receiving at least one selected from the group consisting of a dimension range and a tolerance range.

11. The method of claim 1, further comprising including a legend of the type of CAD metadata within the user interface.

12. The method of claim 1, wherein providing CAD metadata to the user includes listing information associated with CAD metadata in a report.

13. A system for searching computer-aided design (CAD) data, the system comprising:
an electronic processor configured to
receive a selection of a type of CAD metadata via a user interface,
change the user interface to include at least one input mechanism for receiving a search parameter associated with the type of CAD metadata selected, wherein the search parameter includes at least one selected from a group consisting of a production process, a waviness value, a machining value, a roughness value, a symbol value, a tolerance value, a dimension value, a tolerance value, a unit of measurement, a dimension range, and a tolerance range,
receive the search parameter through the user interface,
in response to receiving the search parameter, automatically identify CAD metadata matching the search parameter, wherein the CAD metadata is associated with the CAD data, and
provide the CAD metadata matching the search parameter to a user.

14. The system of claim 13, wherein the electronic processor is configured to provide the CAD metadata to the user by highlighting CAD metadata within the CAD data, wherein the CAD data includes a two-dimensional drawing or a three-dimensional model.

15. The system of claim 13, wherein the electronic processor is configured to provide the CAD metadata to the user by including information associated with the CAD metadata in a report.

16. The system of claim 13, wherein the type of CAD metadata includes at least one selected from the group consisting of a geometric dimensioning and tolerance symbol, a surface finish symbol, a dimension, and an identification symbol.

17. The system of claim 13, wherein the type of CAD metadata includes at least one selected from the group consisting of a datum and a text string.

18. The system of claim 13, wherein the electronic processor is further configured to receive the selection of the type of CAD metadata through the user interface.

19. A non-transitory computer-readable medium containing instructions that, when executable by an electronic processor, perform a set of functions comprising:
receiving a selection of a type of computer-aided design (CAD) metadata via a user interface, wherein the type of CAD metadata includes at least one selected from a group consisting of a geometric dimensioning and tolerance symbol, a surface finish symbol, a dimension, an identification symbol, a datum, and a text string;
changing the user interface to include at least one input mechanism for receiving a search parameter associated with the type of CAD metadata selected;
receiving the search parameter through the user interface;
in response to receiving the search parameter, automatically identifying CAD metadata matching the search parameter, wherein the CAD data includes a two-dimensional drawing or a three-dimensional model and the CAD metadata is associated with CAD data; and
providing the CAD metadata matching the search parameter to a user.

* * * * *